![United States Patent Office logo] 2,789,038
Patented Apr. 16, 1957

2,789,038

PREPARATION OF IMPERVIOUS GRAPHITE

George A. Bennett, Newark, Del., and Toshio H. Inatomi, Los Angeles, and Jack M. Fiskin, Downey, Calif., assignors, by mesne assignments, to the United States of America as represented by the United States Atomic Energy Commission No Drawing. Application December 3, 1953,
Serial No. 396,084

4 Claims. (Cl. 23—209.1)

This invention relates to graphite and particularly to a process for decreasing the permeability of a graphite object.

The permeability of a porous medium is defined as the volume of a fluid of unit viscosity passing through a unit cross-section of the medium in unit time under the action of a unit pressure gradient. The permeability of any given porous specimen is therefore readily determined from measurements of the pressure and time required to pass a given quantity of gas of known viscosity through a specimen of known dimensions. The unit measurement of permeability is the darcy. At the present time, commercial grade fine-grain graphite has a permeability in the range 7 to 9 millidarcys.

In the field of high temperature liquid metal fluid circuits, one of the best materials available, from a mechanical structure point of view, for the construction of the component parts of the circuit is graphite. Graphite is highly corrosive-resistant to most liquid metals and is able to withstand high temperatures and still maintain good structural strength. Graphite has a disadvantage as a fluid conveying material because of its many small interconnected pores, which allow a considerable amount of leakage of the fluids being conveyed. As an example, such metals as liquid bismuth or molten lead readily leak through the pores of graphite even under comparatively low pressures. Thus, while the mechanical properties of graphite at high temperatures are very favorable in this field, present commercially produced fine-grained graphites are not sufficiently impervious to liquid metals.

The highest density of the commercial grade graphites which are at present produced is approximately 1.70 grams per cubic centimeter. Comparing this density with the theoretical maximum graphite density of 2.25 grams per cubic centimeter, it is clear that these graphites have a porosity of almost 25%. That is, 25% of the volume which could be filled with graphite crystals is composed of voids or pores. In addition, a detailed analysis of past commercial grade graphite blocks establishes that the pore size distribution within the block is very undesirable. This analysis shows that almost 50% of the pores' volume consists of pores having a diameter of more than 4 microns. The large size of the pores results in the high leakage rate of fluids. Although there are presently available graphites which have a higher density and a larger percentage of small pores, the processes used in making these high density graphites has resulted in depositing in the pores a considerable amount of undesirable impurities, such as sulphur, silicon dioxide, ferric oxide, calcium oxide and magnesium oxide.

It is therefore an object of this invention to provide a process for decreasing the permeability of a graphite object.

It is another object of this invention to provide a method of increasing the density and decreasing the porosity of a graphite object, without introducing undesired impurities, comprising filling the pores of the graphite object with a suitable hydrocarbon and decomposing the hydrocarbon in place.

It is a further object of this invention to provide a method of improving the permeability of a graphite object comprising continuously diffusing a gaseous hydrocarbon into the graphite pores and simultaneously heating the graphite object above the decomposition temperature of the hydrocarbon to thereby decompose said hydrocarbon in the pores depositing pure carbon within the pores.

It is another object of this invention to provide a method of improving the permeability of a graphite object comprising alternately diffusing a gaseous hydrocarbon into the graphite pores and heating the graphite object above the decomposition temperature of said hydrocarbon and repeating said steps until the pores of said graphite object are filled with pure carbon formed by the decomposition of said hydrocarbon.

It is still another object of this invention to provide a method of improving the density of graphite comprising the steps of diffusing helium through the pores of said graphite at a predetermined rate, heating said graphite to approximately 2000° F., diffusing an acetylene-helium mixture through the pores of said graphite, diffusing pure helium through the pores of said graphite, and cooling said graphite.

Other objects of invention will become apparent from the following description.

As has already been noted, the commercial grade graphite presently available has numerous comparatively large pores. These pores are interconnected thereby forming a path through which many fluids leak with comparative ease. In the process contemplated by this invention, described in detail below, a gaseous hydrocarbon which decomposes when subjected to temperatures between 2000 and 3000° F. is forced into the pores. The graphite is then heated to above the decomposition temperature of the gaseous hydrocarbon thereby decomposing the hydrocarbon into solid particles of carbon and gases, consisting of other hydrocarbons and hydrogen. The carbon particles remain in the pores while the gases are forced out by a new batch of the impregnating gaseous hydrocarbon. A deposition of this carbon in the pores effectively decreases the pore size and increases the density of the graphite. The decreased pore size is reflected in a corresponding decrease in the permeability of the graphite. Among the gaseous hydrocarbons which have the desired characteristics are acetylene, methane, and propane.

It is to be noted that the temperature of the gaseous hydrocarbon should be raised above its decomposition temperature while the hydrocarbon is within the pores of the graphite body. Among the methods for accomplishing this objective are the following two which are described in detail. The first is called the flow method in which the gaseous hydrocarbon is continuously flowing through the pores of the graphite body while simultaneously the graphite is being heated by suitable means to above the decomposition temperature of the hydrocarbon. The second method is called the batch method. This method entails a filling of the pores of the graphite body with the gaseous hydrocarbon and subsequently heating the graphite body to above the decomposition temperature of the hydrocarbon. A new batch of the gaseous hydrocarbon is then forced into the pores and the heating step repeated.

The first method contemplated by this invention for decreasing the permeability of a graphite body can best be described by following through a cycle of operation. Assume, by way of example, that the hydrocarbon to be decomposed is acetylene, $C_2H_2$. The graphite body is preferably placed in an induction furnace which effectively heats the graphite body by inducing eddy currents in the graphite. First, helium gas under a pressure of approximately two atmospheres is impressed on one surface of the object. The opposite surface is subjected to a vacuum. After the helium has diffused through the graphite pores thereby effectively removing air from the pores, the induction furnace is energized. The graphite body is allowed to heat to approximately 2000° F. Now, a small amount of acetylene is mixed with helium which is being continuously diffused through the pores. In this case, the combined pressure is maintained below two atmospheres because of the spontaneously explosive nature of acetylene. The helium-acetylene mixture is gradually enriched with acetylene until finally pure acetylene is being diffused through the pores of the graphite object.

It is to be noted that the rate of flow of the gas mixture through the pores of the graphite object gradually decreases. This is due to the progressive filling of the pores with carbon formed by the decomposition within the pores of the acetylene. An analysis of the gases leaving the graphite body indicates the presence of a considerable amount of hydrogen. During the entire period of supplying acetylene to the body, the induction furnace is energized and the temperature of the graphite is maintained at least at 2000° F. After the rate of gas flow has fallen to a negligible value, the apparatus is shut down. Shutdown is accomplished by rapidly decreasing the amount of acetylene in the gases diffused through the pores while increasing the amount of helium. Finally pure helium once again flows through the pores. After a short period of time during which substantially all of the acetylene and hydrogen which are present in the pores are replaced by helium, the induction furnace is de-energized and the graphite body is allowed to cool.

The permeability of the graphite object formed by this flow method can be further decreased by reversing the direction of flow of the acetylene-helium mixture approximately midway in the decomposition step. This results in a more nearly uniform distribution of the carbon particles in the pores. The permeability of the graphite is easily reduced by this method to values much less than 10% of its original value. That is, if the permeability of a graphite specimen was originally 9 millidarcys, after being subjected to the above-described process, the specimen has a permeability of 0.9 millidarcy or less.

An even greater reduction in permeability is obtained by utilizing the second method or batch type of flow. This method utilizes the filling of the pores with acetylene prior to heating. The flow of acetylene is then stopped and the body heated to at least 2000° F. in an induction furnace. The body is then cooled and a fresh supply of acetylene is conveyed into the pores. Heat sufficient to raise the temperature of the graphite body to at least 2000° F. is again applied. Repeating this process numerous times effectively reduces the permeability of the graphite to a negligible value. For example, 15 cycles of the above-described batch operation effectively reduced the permeability of a graphite specimen to 2% of its original value.

It is contemplated by this invention that other heating means may be substituted for the induction furnace of the above-described examples. The heating means should effectively heat the gas to above its decomposition temperature while the gas is in the pores of the graphite but not before it enters the pores. Thus, a muffle furnace has also been used to heat the hydrocarbon gas while it is in the pores without heating the gas to its decomposition temperature before it enters the pores. It is further contemplated by this invention that other hydrocarbons which are characterized by decomposition to hydrogen gas and solid carbon at high temperatures, i. e. between 2000° F. and 3000° F., may be substituted for the acetylene gas in the detailed descriptions above. For example, methane, $CH_4$, and propane, $C_3H_8$, have been used successfully in the processes of this invention to materially decrease the permeability of a graphite specimen.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A method of reducing the permeability of graphite comprising the steps of diffusing helium through the pores of said graphite at a predetermined rate, heating said graphite to at least 2000° F., mixing a gaseous hydrocarbon taken from the group consisting of acetylene, methane, and propane with said helium flowing through the pores of said graphite, subsequently diffusing pure helium through the pores of said graphite, and cooling said graphite whereby said hydrocarbon decomposes in the pores of said graphite depositing therein solid carbon particles.

2. A method as described in claim 1 in which said gaseous hydrocarbon is acetylene.

3. A method as described in claim 1 in which said gaseous hydrocarbon is methane.

4. A method as described in claim 1 in which said gaseous hydrocarbon is propane.

References Cited in the file of this patent
UNITED STATES PATENTS

| | | |
|---|---|---|
| 916,905 | Whitney | Mar. 30, 1909 |
| 1,199,220 | Szarvasy | Sept. 26, 1916 |
| 2,392,682 | Marek | Jan. 8, 1946 |
| 2,719,779 | Bray et al. | Oct. 4, 1955 |